US011023655B2

(12) United States Patent
Campbell

(10) Patent No.: US 11,023,655 B2
(45) Date of Patent: Jun. 1, 2021

(54) ACCESSIBILITY DETECTION OF CONTENT PROPERTIES THROUGH TACTILE INTERACTIONS

(71) Applicant: MICROSOFT TECHNOLOGY LICENSING, LLC, Redmond, WA (US)

(72) Inventor: John Campbell, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 14 days.

(21) Appl. No.: 14/302,230

(22) Filed: Jun. 11, 2014

(65) Prior Publication Data

US 2015/0363365 A1 Dec. 17, 2015

(51) Int. Cl.
*G06F 3/01* (2006.01)
*G06F 3/041* (2006.01)
(Continued)

(52) U.S. Cl.
CPC ............ *G06F 40/106* (2020.01); *G06F 3/016* (2013.01); *G06F 3/0412* (2013.01); *G09B 21/003* (2013.01)

(58) Field of Classification Search
CPC ............... G06F 3/016; G06F 2203/014; G06F 2203/013; G06F 2203/04809;
(Continued)

(56) References Cited

U.S. PATENT DOCUMENTS 5,461,399 A * 10/1995 Cragun .................. G06F 3/011
715/729
7,616,192 B2 11/2009 Schroeder
(Continued)

FOREIGN PATENT DOCUMENTS

| CN | 102591518 A | 7/2012 |
|---|---|---|
| CN | 102971689 A | 3/2013 |
| CN | 103677262 A | 3/2014 |

OTHER PUBLICATIONS

Asakawa et al. (Auditory and Tactile Interfaces for Representing the Visual Effects on the Web, published Jul. 2002, hereinafter as Asakawa, pp. 1-8).*

(Continued)

*Primary Examiner* — Stephen S Hong
*Assistant Examiner* — Ahamed I Nazar
(74) *Attorney, Agent, or Firm* — NovoTechIP International PLLC

(57) ABSTRACT

One or more tactile effects may be mapped to application user interface elements, formatting properties, and document structure and applied to a display comprising tactile capabilities (e.g., deformable screens, vibrations, static charges, heat, etc.). Formatting, structure, and user interface elements may be mapped to different screen variations that may be felt by a visually impaired user. A visually impaired user may be able to utilize his/her sense of touch to more easily comprehend formatting and structure of a document, as well as to have greater confidence to author professional and consistently formatted and structured documents. A tactile effect may be applied to a location of a displayed user interface element, formatting property, or document structure, or may be applied to a designated area of the display.

18 Claims, 12 Drawing Sheets

(51) Int. Cl.
*G06F 17/21* (2006.01)
*G06F 40/106* (2020.01)
*G09B 21/00* (2006.01)

(58) Field of Classification Search
CPC ... G06F 17/212; G06F 3/0412; G09B 21/003; G09B 21/007; G09B 21/004
See application file for complete search history.

(56) References Cited

U.S. PATENT DOCUMENTS

| | | | |
|---|---|---|---|
| 8,201,090 B2 | 6/2012 | Beitle et al. | |
| 9,760,174 B1* | 9/2017 | Letendre | G06F 3/016 |
| 2002/0143817 A1* | 10/2002 | Dutta | G09B 21/001 |
| | | | 715/234 |
| 2004/0080532 A1* | 4/2004 | Cragun | G06F 17/30716 |
| | | | 715/745 |
| 2007/0168891 A1* | 7/2007 | Damery | G10L 13/00 |
| | | | 715/865 |
| 2007/0229233 A1 | 10/2007 | Dort | |
| 2008/0034294 A1* | 2/2008 | Ronkainen | G06F 1/1626 |
| | | | 715/702 |
| 2009/0102805 A1* | 4/2009 | Meijer | G06F 3/016 |
| | | | 345/173 |
| 2009/0128503 A1* | 5/2009 | Grant | G06F 3/016 |
| | | | 345/173 |
| 2009/0128505 A1* | 5/2009 | Partridge | G06F 3/04883 |
| | | | 345/173 |
| 2011/0181520 A1 | 7/2011 | Boda et al. | |
| 2011/0289402 A1* | 11/2011 | Hiitola | G06F 3/016 |
| | | | 715/234 |
| 2012/0070805 A1* | 3/2012 | Wong | G09B 21/005 |
| | | | 434/114 |
| 2012/0139844 A1* | 6/2012 | Ramstein | G06F 3/016 |
| | | | 345/173 |
| 2012/0327006 A1 | 12/2012 | Israr et al. | |
| 2013/0222311 A1* | 8/2013 | Pesonen | G06F 3/016 |
| | | | 345/173 |
| 2013/0332815 A1* | 12/2013 | Gallo | G09B 21/008 |
| | | | 715/234 |
| 2014/0049491 A1 | 2/2014 | Nagar et al. | |
| 2014/0055358 A1* | 2/2014 | Birnbaum | G06F 3/016 |
| | | | 345/168 |
| 2014/0089791 A1 | 3/2014 | Ishimaru | |
| 2014/0281954 A1* | 9/2014 | Ullrich | G06F 15/0291 |
| | | | 715/702 |
| 2015/0253850 A1* | 9/2015 | Behles | G06F 3/016 |
| | | | 715/702 |

OTHER PUBLICATIONS

Asakawa et al. (Auditory and Tactile Interfaces for Representing the Visual Effects on the Web, published Jul. 8-10, 2002, pp. 1-8, hereinafter as Asakawa) (Year: 2002).*
Xu, et al., "Tactile Display for the Visually Impaired Using TeslaTouch", In Proceedings of Extended Abstracts on Human Factors in Computing Systems, May 7, 2011, 6 pages.
"Haptic Feedback Tablets Helps Visually Impaired Students", Published on: Mar. 25, 2012, Available at: http://bdmtech.blogspot.in/2012/03/haptic-feedback-helps-visually-impaired.html.
Kane, et al., "Touchplates: Low-Cost Tactile Overlays for Visually Impaired Touch Screen Users", In Proceedings of the 15th International ACM SIGACCESS Conference on Computers and Accessibility, Oct. 21, 2013, 8 pages.
Kane, et al., "Fully Accessible Touch Screens for the Blind and Visually Impaired", Retrieved on: Dec. 18, 2013, Available at: http://faculty.washington.edu/wobbrock/pubs/nish-09.pdf.
Stolk, Nikko Van, "Tuvie", Published on: Sep. 9, 2010, Available at: http://www.tuvie.com/tactile-enables-visually-impaired-people-to-access-mobile-devices-through-a-system-of-digital-texture/.
"Taking Touch Screen Interfaces into a New Dimension", In White Paper of Tactus Technology, Jun. 16, 2012, 13 pages.
Nikolakis, et al., "CyberGrasp and Phantom Integration: Enhanced Haptic Access for Visually Impaired Users", In Proceedings of 9th Conference Speech and Computer, Sep. 20, 2004, 7 pages.
"International Search Report and Written Opinion Issued in PCT Application No. PCT/US2015/034610", dated Sep. 16, 2015, 10 Pages.
"First Office Action and Search Report Issued in Chinese Patent Application No. 201580031025.0", dated Nov. 2, 2018, 16 Pages.
"International Preliminary Report on Patentability Issued in PCT Application No. PCT/US2015/034610", dated May 3, 2016, 7 Pages.
"Second Office Action and Search Report Issued in Chinese Patent Application No. 201580031025.0", dated Jul. 26, 2019, 15 Pages.
"Notice of Allowance Issued in Chinese Patent Application No. 201580031025.0", dated Apr. 24, 2020, 8 Pages.
"Third Office Action Issued in Chinese Patent Application No. 201580031025.0", dated Dec. 23, 2019, 25 Pages.

* cited by examiner

MOBILE COMPUTING DEVICE

ACCESSIBILITY DETECTION OF CONTENT PROPERTIES THROUGH TACTILE INTERACTIONS

BACKGROUND

For visually impaired users of computing devices, document reading and authoring can be difficult. Currently, some assistive technologies exist that read aloud document content as a user tabs through the contents of a document, for example, via a keyboard key or via scrubbing his/her finger across the screen (of a touch device enabled with a touch screen reader). Such technologies have varying levels of accuracy and involve the user understanding what is read aloud and mentally visualizing the document to get a sense of what the content is and how it looks.

Some current screen readers may be operable to read certain properties of document content (e.g., location, the data, formatting, etc.). For example, in a spreadsheet document where the content of a first cell is $324, wherein the content is formatted with underline, bold, and red font, a screen reader may read aloud, "Cell A1. Contents, 324 dollars. Bold. Underlined. Color, Red." A visually impaired user may have to keep in mind each of the properties and the document content to build a mental picture of what a sighted user may be able to comprehend at a single glance.

The problem may be further compounded when a visually impaired user wishes to author content. For example, trying to enter content into a correct location and applying formatting to a document without being able to see what the document looks like can be very challenging, especially when trying to author a document that looks good, consistent, and professional.

Currently, there is not an assistive technology available that allows visually impaired users to utilize their other senses to detect formatting, content, and consistency of a document without requiring the user to read one word/cell/node at a time and to remember the formatting that has been applied. It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing mapping of tactile effects to application user interface elements, formatting properties, and document structure. By utilizing a display with one or more tactile capabilities (e.g., deformable screens, vibrations, static charges, heat, etc.), formatting, structure, and user interface elements may be mapped to different screen variations that may be felt by a visually impaired user. A visually impaired user may be able to utilize his/her sense of touch to more easily comprehend formatting and structure of a document, as well as to have greater confidence to author professional and consistently formatted and structured documents.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
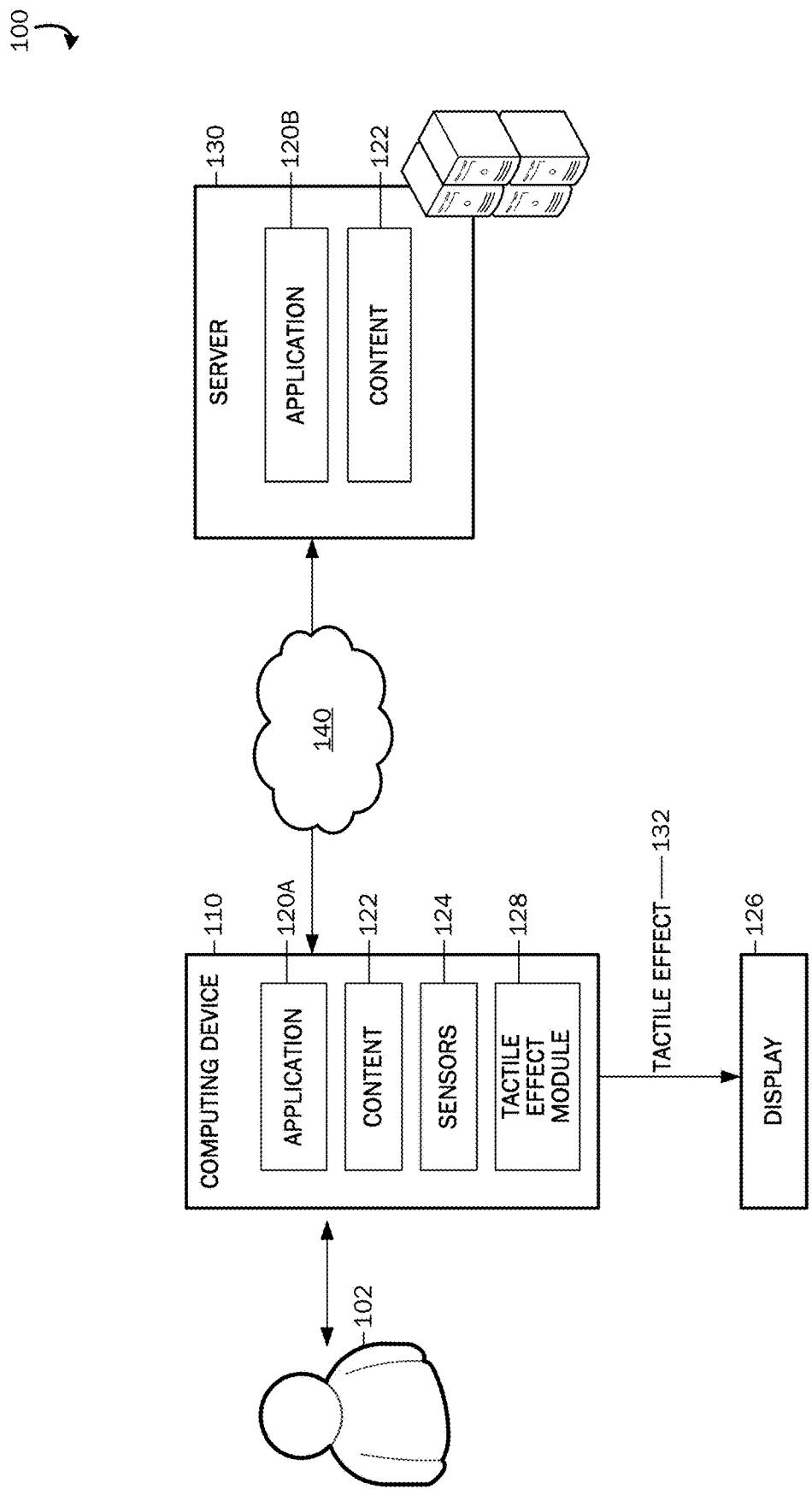
FIG. 1 is a block diagram of one embodiment of a system for providing mapping of tactile effects to application user interface elements, formatting properties, and document structure.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Embodiments of the present invention are directed to providing mapping of tactile effects to application user interface elements, formatting properties, and document structure. Referring now to the drawings, in which like numerals represent like elements, various embodiments will be described. FIG. 1 is a block diagram illustrating a system architecture 100 for providing mapping of tactile effects to application user interface elements, formatting properties, and document structure. The network architecture 100 includes a computing device 110. The computing device 110 may be one of various types of computing devices (e.g., a tablet computing device, a desktop computer, a mobile communication device, a laptop computer, a laptop/tablet hybrid computing device, a large screen multi-touch display, a gaming device, a smart television, or other types of computing devices) for executing applications 120A,B (collectively 120) for performing a variety of tasks. The physical components (i.e., hardware) of a computing device 110 with which embodiments of the invention may be practiced will be described in further detail below with reference to FIG. 4.

A user 102 may utilize an application 120 on a computing device 110 for a variety of tasks, which may include, for example, to read, write, calculate, draw, organize, prepare presentations, send and receive electronic mail, take and organize notes, make music, and the like. Applications 120 may include thick client applications 120A, which may be stored locally on the computing device 110, or may include thin client applications 120B (i.e., web applications) that may reside on a remote server 130 and accessible over a network 140, such as the Internet or an intranet. A thin client application 120B may be hosted in a browser-controlled environment or coded in a browser-supported language and reliant on a common web browser to render the application executable on a computing device 110.

An application 120 may be configured to enable a user 102 to use a pointing device (e.g., a mouse, pen/stylus, etc.) and/or to utilize sensors 124 (e.g., touch sensor, accelerometer, hover, facial recognition, voice recognition, light sensor, proximity sensor, gyroscope, tilt sensor, GPS, etc.) on the computing device 110 to interact with content 122 via a number of input modes. To assist users to locate and utilize functionalities of a given application 120, a user interface (UI) containing a plurality of selectable functionality controls may be provided.

The computing device 110 may be configured to receive content 122 for presentation on a display 126. According to embodiments, the display 126 may be one of various types of displays that are operable to provide information in one or more tactile forms, such as via deformed buttons and shapes, vibration, heat, friction, modulating frequencies, etc. For example, the display 126 may comprise a gas or microfluidic tactile panel, electro-active polymers, piezoelectric, electrostatic, or subsonic surface actuators, etc. That is, the functionalities of the display 126 may be operable to produce a change to the display 126 that a user 102 may be able to detect through his/her sense of touch.

Tactile effects 132 (e.g., heat, vibration, deformations, friction, etc.) may be actuated via a tactile effect module 128. According to embodiments, the tactile effect module 128 may be operable to map one or more tactile effects 132 to document structure, document formatting, and/or application user interface elements. The tactile effect module 128 may additionally be operable to convert text to braille via mapping deformation tactile effects 132 in braille dot patterns to text in a document.

Formatting properties such as color (e.g., background color, font color, fill color, etc.), font size, font emphasis (e.g., bold, italics, strikethrough, underline, etc.), etc. and structural properties (e.g., tables, banded tables, bulleted lists, alignment, indents, pivot tables, body sections of a page, header, footers, pictures, shapes, images, charts, comments, hyperlinks, text boxes, signature lines, equations, inline applications, etc.) may be read from existing styles, file formats, and specifiers using standard industry conventions.

A formatting or structure specifier may comprise a construct inside of which an index, alignment, or format rule may define the formatting or structure of an element. For example, the color of text inside a font element (formatting property) in a word processing document may be specified with CSS syntax, which may be read by the tactile effect module 128, mapped to a specific tactile effect 132 (e.g., deformation), and applied to the display 126. As another example, right-justified text (structural property) in a web page may be specified with an HTML tag, which may be read by the tactile effect module 128, mapped to a specific tactile effect 132 (e.g., localized vibration), and applied to the display 126.

According to an embodiment, a tactile effect 132 or a combination of tactile effects 132 to which a formatting property or structure is mapped may be mapped according to a predefined standard. For example, a standard may be set where bold formatting may be mapped to a single vibration or to a deformation of a certain height. According to another embodiment, a display 126 may be operable to support providing a single tactile effect 132 or limited tactile effects. Accordingly, a single formatting property may be mapped to the tactile effect 132 supported by the display 126. For example, a display 126 of a computing device 110 may be operable to apply a localized vibration to different parts of the screen, but may not support other tactile effects 132 (e.g., deformations, modulating frequencies, heat, etc.). Accordingly, when a request is received to "show" the user 102 a specific formatting property or structure, the tactile effect 132 supported by the display 126 may be applied to the display 126 at the location(s) of specifically formatted element(s) and/or structured elements or in a defined area of the display 126 as will be described in greater detail below.

According to embodiments, a tactile effect 132 may be an on/off effect or may be scaled according to the level of formatting. An example of an on/off tactile effect 132 may include mapping a deformation to underlined elements. As a user 102 moves his fingers across the display 126, the screen may be deformed where underlined elements are displayed in a document. Some displays 126 may support multiple degrees of a tactile effect 132 for graduated levels of formatting. For example, if font size is mapped to a modulating frequency tactile effect 132, the larger the font size, the stronger the friction may be. The rate of change of a tactile effect 132 may be mapped to graduated levels of formatting via a simple curve.

Figure 2A:
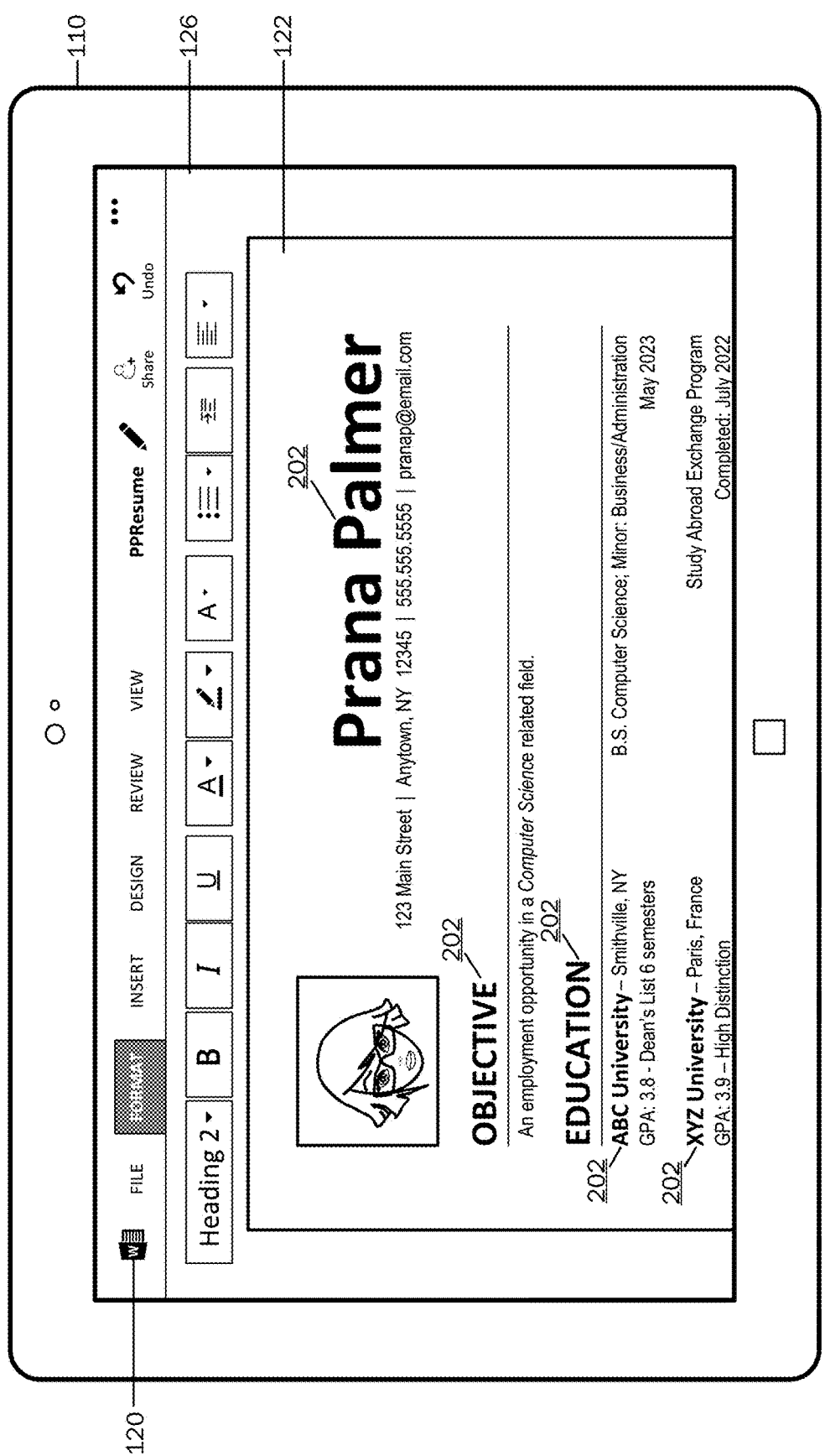
FIG. 2A is an illustration of an example word processing document comprising various formatting properties which may be mapped to tactile effects.
Figure 2B:
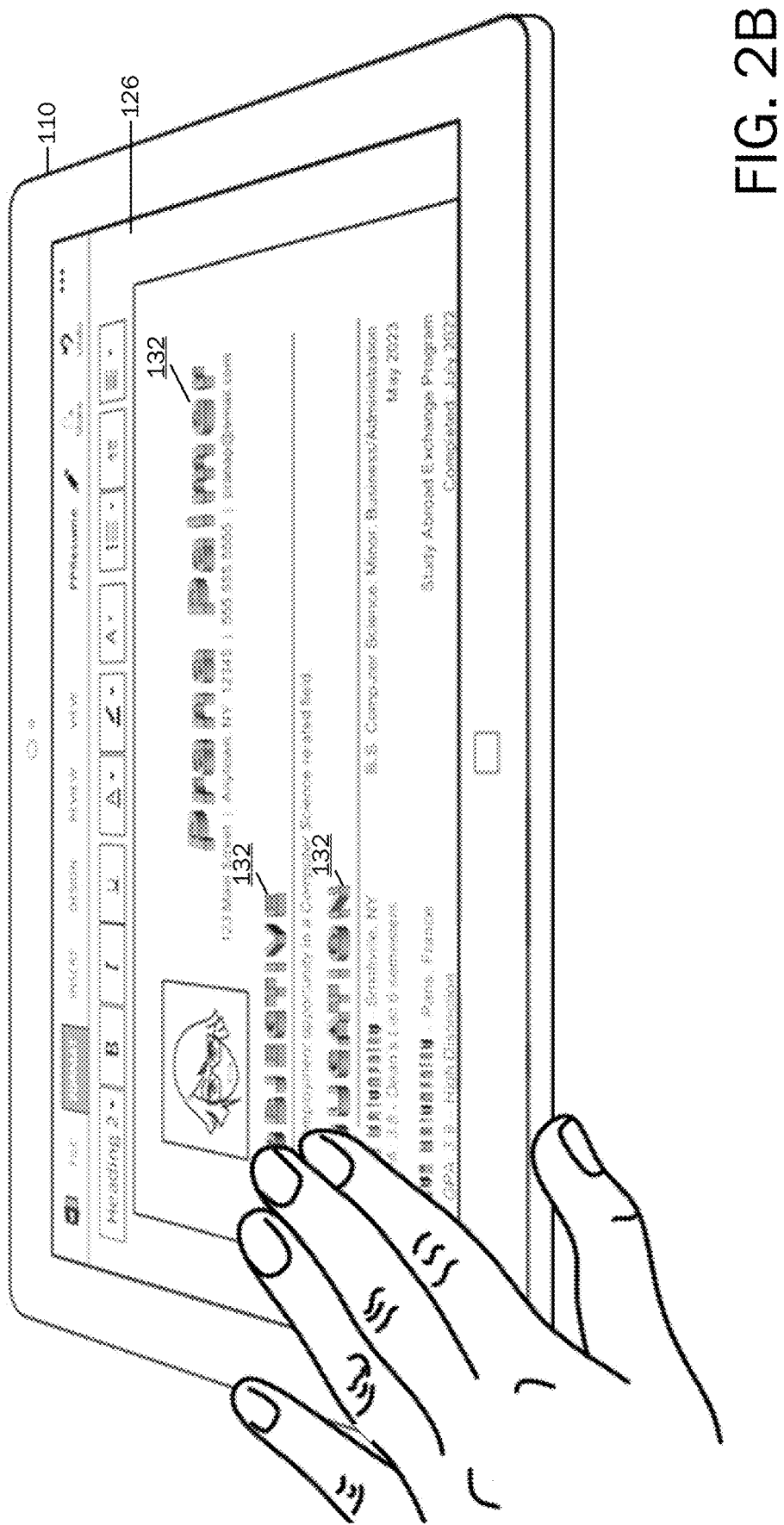
FIG. 2B is an illustration of a deformation tactile effect applied to a formatting property.
Figure 2C:
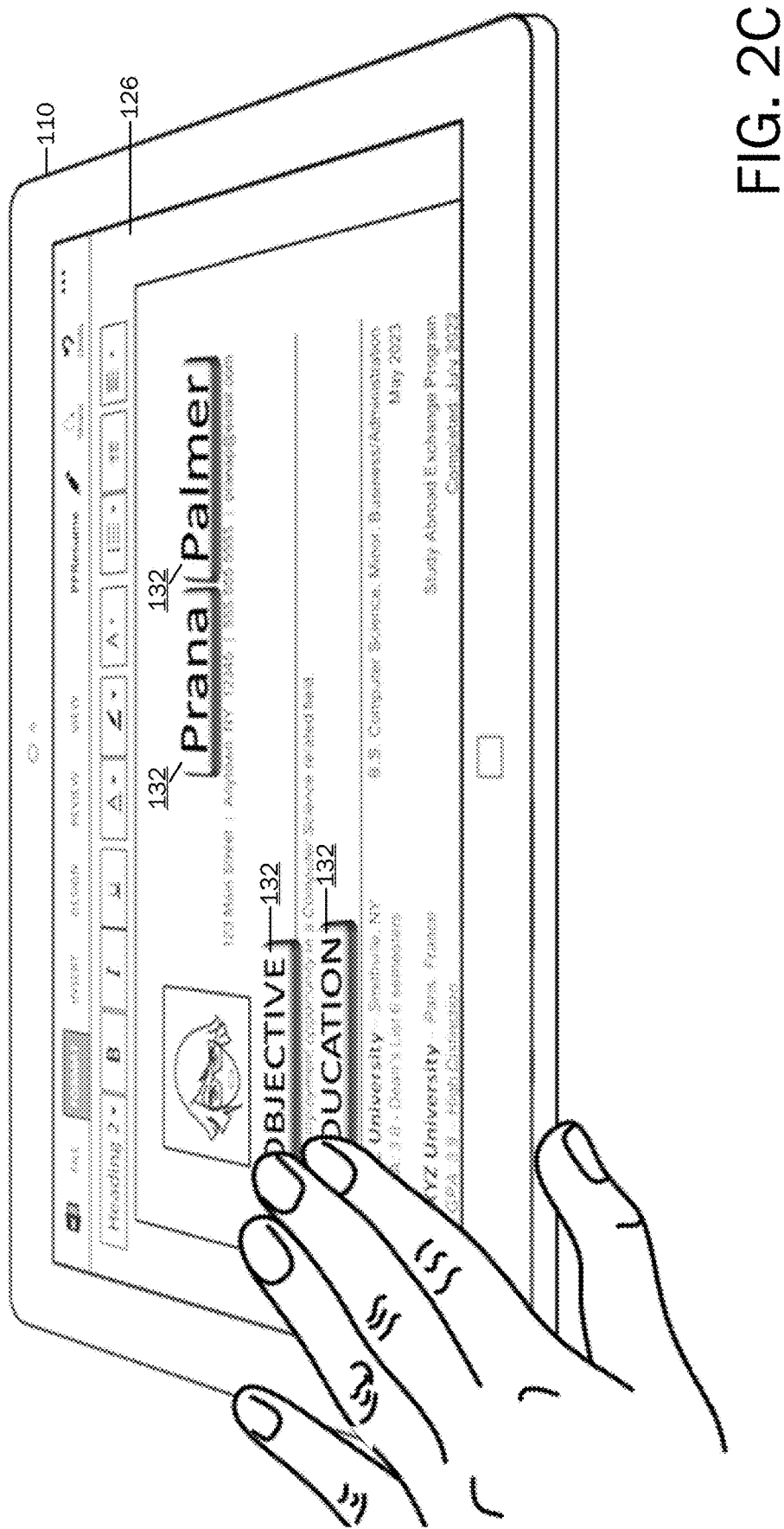
FIG. 2C is another illustration of a deformation tactile effect applied to a formatting property.

Examples of a deformation tactile effect 132 mapped to a formatting property 202 are illustrated in FIGS. 2A-2C. In the illustrated example, a computing device 110 is shown, the computing device 110 comprising a display 126 operable to display content 122 and to provide information in one or more tactile forms. The computing device 110 illustrated in FIGS. 2A-2C is a tablet computing device; however, it should be understood that the illustrated tablet computing device is for purposes of example and illustration and is not limiting of a vast number of computing device configurations that may be utilized for practicing embodiments of the invention, described herein.

The example displayed content 122 illustrated in FIG. 2A is a word processing document and includes various formatting properties 202, such as bold text, italicized text, and assorted font types and sizes. In the example illustrated in FIG. 2A, a request to map a tactile effect 132 to a formatting property 202 may be received, for example, to map a tactile effect 132 to bold text.

Upon receipt of the request, a tactile effect 132 may be mapped to the formatting property 202 and applied to the display 126. In the examples illustrated in FIGS. 2B and 2C, a deformation tactile effect 132 is applied to the bold text 202 of the document. According to the technological capabilities of computing device 110 and display 126, a tactile effect 132 may be applied to an element comprising a particular formatting element (or structure 204) as illustrated in FIG. 2B, or may be applied to an area approximate to the formatted element (or structure) as illustrated in FIG. 2C.

Figure 2D:
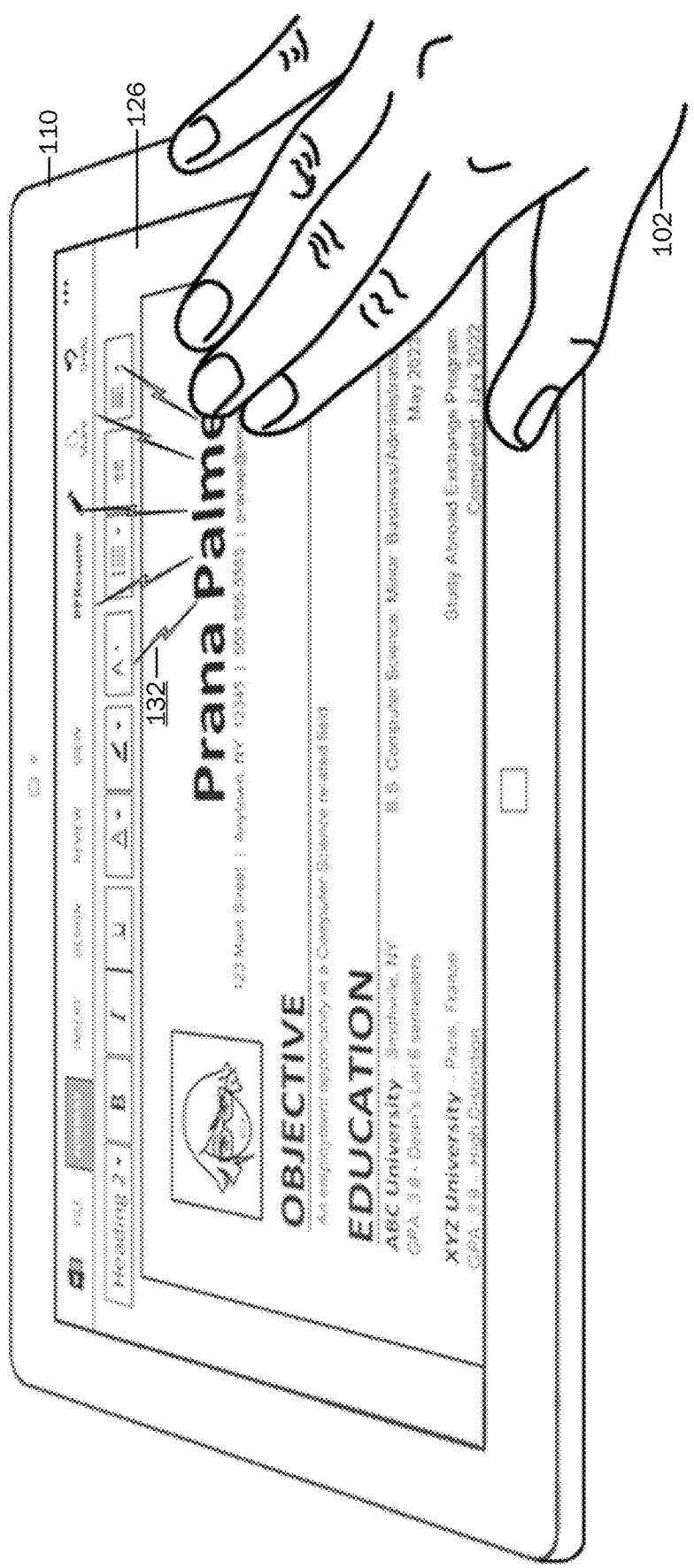
FIG. 2D is an illustration of a vibration tactile effect applied to a formatting property.

An example illustration of a vibration tactile effect 132 is shown in FIG. 2D. As illustrated, a vibration tactile effect 132 may be mapped and applied to bold formatting in the displayed document. The vibration tactile effect 132 may be applied prior to the user 102 touching the formatted element or may be applied upon detection of a touch.

According to an embodiment, a formatting property 202 or a structure 204 may be mapped to a single tactile effect 132. In some cases, multiple tactile effects 132 may be applied to an element, for example, if the element comprises various formatting properties 202 and/or structures 204. As an example, a heat event and a deformation may be applied to text that is red and formatted in a "heading 1" style. According to another embodiment, a formatting property 202 or a structure 204 may be mapped to a combination of tactile effects 132. For example, a deformation and a vibration may be applied to a picture in a document. According to another embodiment, formatting properties 202 and structure 204 may be mapped to a combination of effects, which may comprise a tactile effect 132 and another type of effect, such as an audible effect. For example, as a user 102 swipes his/her fingers over content in a document, a specific formatting property 202 may be expressed as a noise and may or may not be applied in conjunction with a tactile effect 132.

According to an embodiment, a request to map a tactile effect 132 to a formatting property 202 or structure 204 may be a preset or preselected option, for example, tactile information for bold text or for tables may be automatically provided. According to another embodiment, a request to map a tactile effect 132 to a formatting property 202 or to a structure may be a selection made by a user 102 via one of various types of input methods, for example, keyboard input, touch input, voice input, gesture input, mouse input, etc.

Embodiments provide for selectively applying a tactile effect 132 corresponding to a particular type of formatting property 202 and/or structure 204 (or a combination of particular formatting properties 202 and/or structures 204) at a given time. Accordingly, a tactile effect 132 may be applied to elements or in association with elements comprising the particular formatting property 202 and/or structure 204. For example, a user 102 may indicate (i.e., request) to process a tactile effect 132 for all equations in a document via a voice command, "show me all equations." Accordingly, a particular tactile effect 132 may be mapped to all equation-formatted structure, and the tactile effect 132 may be applied to the display 126.

According to an embodiment, a tactile effect 132 may be mapped to content matching a currently selected formatting property 202 and/or structure 204. For example, a user may touch or select a piece of text in a document and then select a particular user interface (UI) functionality command or speak, "show me all the text that matches this style." Accordingly, all the text in the document that matches the user's selected piece of text may be deformed or have another tactile effect 132 applied.

The tactile effect module 128 may be operable to maintain state as a user 102 explores formatting and structure on a display 126. Consider for example that a user 102 may first request for a tactile effect 132 to be applied to a certain structure 204 in a document. The user 102 may speak a command, "show me all tables." A tactile effect 132, such as heat, may be applied to the tables in the document. The user may then select a table via touching the heated object or via voice or other input method, and request to "show formatted text in the table." Accordingly, a tactile effect 132 may be applied to the text, banded rows, etc. The tactile effect 132 may be a graduated level of the same tactile effect 132 that was first applied, in this example heat, or may be a different tactile effect 132. The tactile effect(s) 132 may continue to be applied, and the user 102 may continue to make requests for tactile effects 132 to be applied to additional formatting properties 202 and structures 204.

According to another embodiment, a user 102 may wish to map a tactile effect 132 to elements that do not match a selected formatted and/or structured element. This may help users 102 to find inconsistencies in his/her document. For example, a user 102 may select a table in a document and say, "show me the tables that don't match this one." Accordingly, a tactile effect 132 may be applied to all tables in the document that have a style combination that does not match the currently selected table.

A user 102 may be enabled to alter formatting of an object based on a current selection. For example, a user may select an object and request to copy the formatting of the object. The tactile effect module 132 may be operable to collect the formatting tags. Upon receiving an indication of a selection of a target object and a request to apply the copied formatting, the copied formatting may be applied to the target object. As an example, a user 102 may select a table that has a bold header row, banded columns, italicized text, and 14 point font. The user 102 may provide a command, "remember this formatting" or "copy this formatting," and then to "show me all tables in the document that are not formatted this way." A tactile effect 132 may then be applied to the tables that do not have the same formatting properties 202. The user 102 may then select a table and make a request to "apply the formatting to this." Accordingly, the copied formatting may be applied.

Figure 2E:
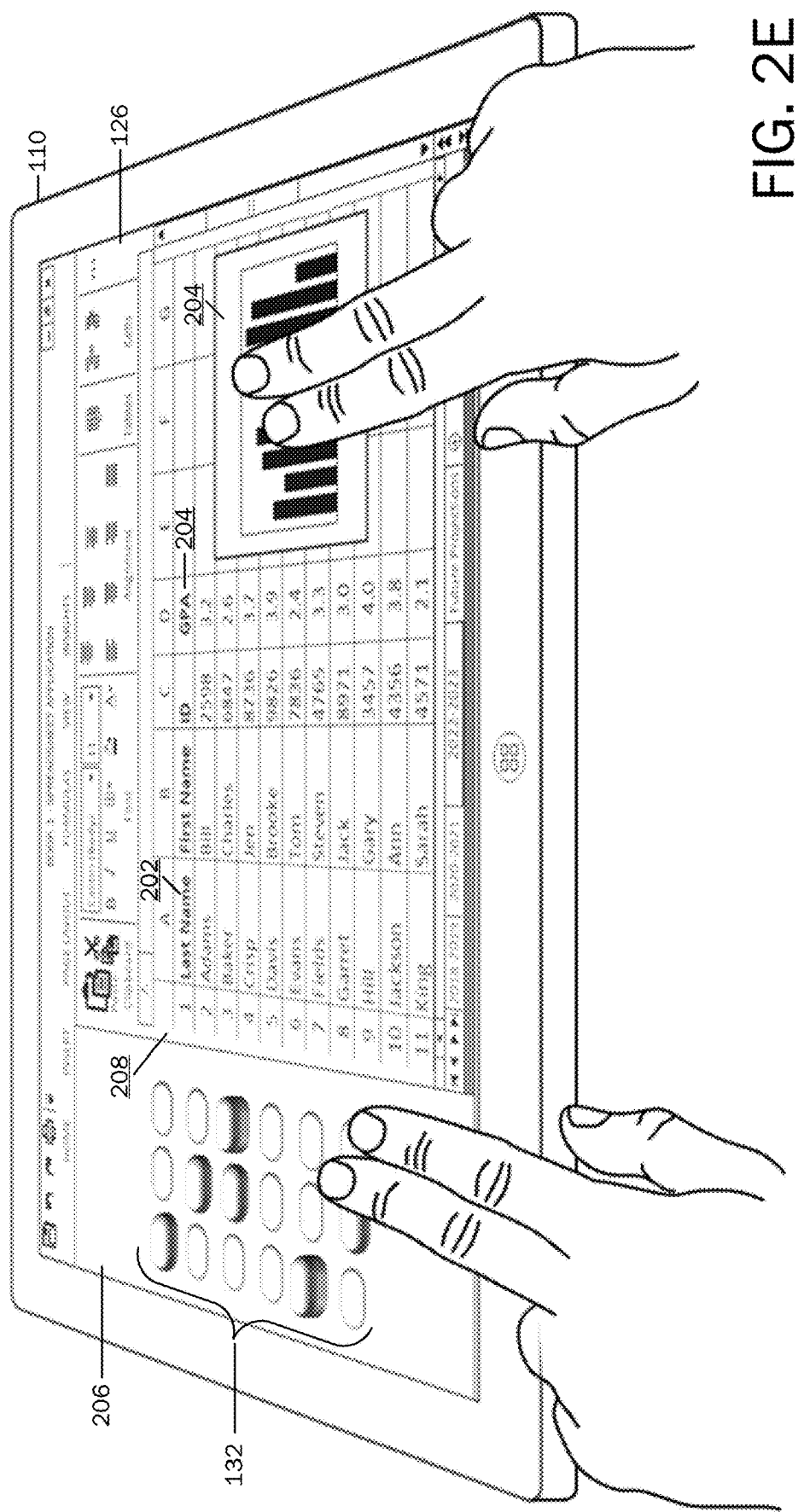
FIG. 2E is an illustration of a deformation tactile effect mapped to a structure and applied in a tactile information area.

According to an embodiment and as illustrated in FIG. 2E, a tactile effect 132 may be applied to a specific localized region of a display 126. That is, instead of applying a tactile effect 132 to the location of a formatted object or structure, a tactile effect 132 may be applied to a designated portion of the display 126, herein referred to as a tactile information area 206. The example illustrated in FIG. 2E shows a spreadsheet document 208 displayed on a computing device 110. The spreadsheet document 208 includes various structures 204 such as a table and a chart, as well as various formatting properties 202 such as bold text, various font types, sizes, etc. Formatting and/or structure may be mapped to a tactile effect 132 or a combination of tactile effects 132 and applied to the tactile information area 206. A user 102 may scan the document with one hand, and formatting properties 202 and/or structure 204 may be expressed in a tactile manner in the tactile information area 206. For example and as illustrated, the user 102 may scan the document 208 with one hand. As he/she touches the graph (structure 204) in the spreadsheet document 208, a pattern of deformations (tactile effect 132) mapped to the particular structure 204 may be applied in the tactile information area 206. The user 102 may feel the deformations with his/her other hand, and interpret the particular structure 204 (or formatting property 202) to which the tactile effect 132 is mapped. Although the tactile effects 132 illustrated in FIG. 2E are deformations, it should be noted that the tactile effect 132 may be one or a combination of various tactile effects 132.

According to an embodiment, the tactile information area 206 may be utilized for training. For example, a tactile effect 132 that is associated with a particular formatting property 202 or structure 204 may be applied in the tactile information area 206. The tactile effect 132 may be isolated from other applied effect such that a user 102 may be able to feel the tactile effect 132 and learn the effect for recognition. The user 102 may then go to a displayed document and find elements with the applied tactile effect 132. Additional information may be provided in or in or in association with the tactile information area 206 that indicates to the user 102 the formatting property 202 or structure 204 that is mapped to the tactile effect 132. For example, as the user touches the tactile effect 132, the formatting property 202 or structure 204 that is mapped to the tactile effect 132 may be read aloud.

Figure 2F:
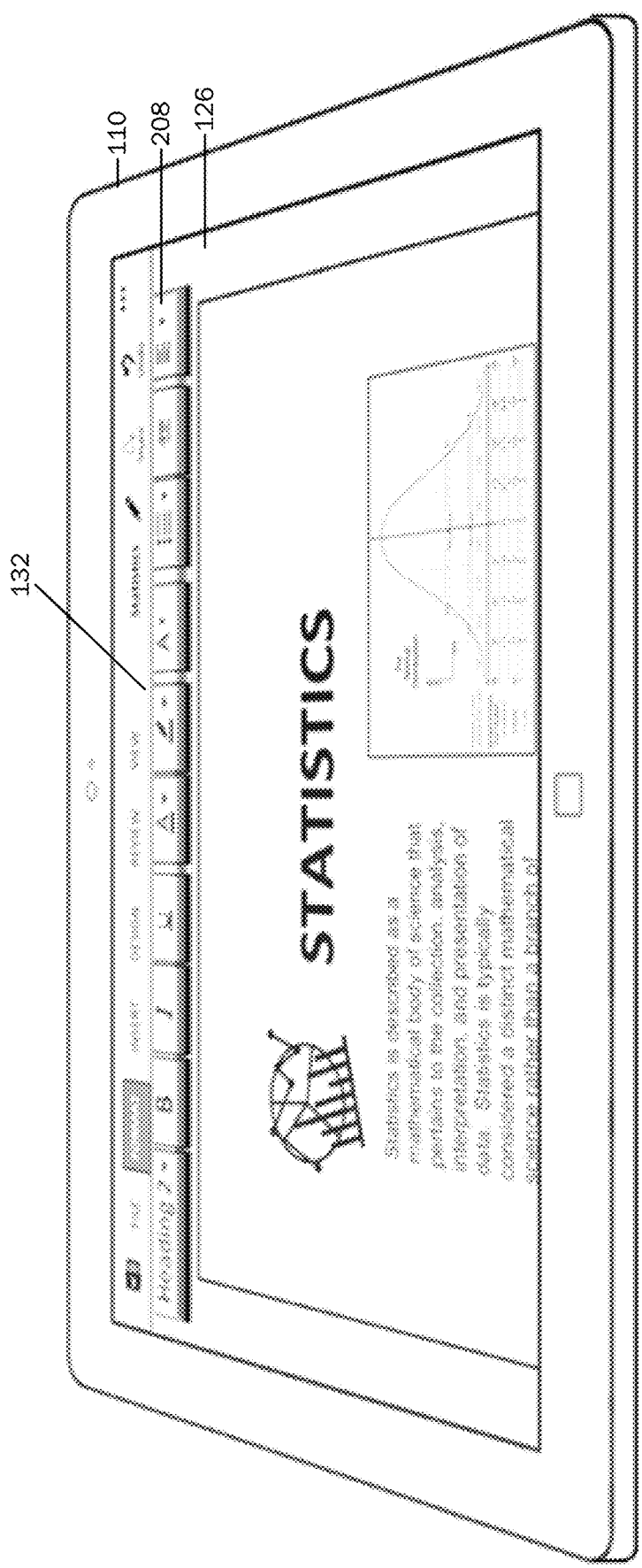
FIG. 2F is an illustration of a deformation tactile effect applied to a user interface element.

As mentioned above, a tactile effect 132 may be mapped to a user interface element, for example, a task pane, a tool bar, user interface functionality commands, etc. With reference now to FIG. 2F, an example illustration of a tactile effect 132 applied to a user interface element 208 is shown. In the illustrated example, a deformation tactile effect 132 is applied to an application toolbar. A user 102 may request via voice command or other input method to apply a tactile effect 132 to the commanding surface. The user 102 may be able to feel where the toolbar is by being able to feel it.

Figure 3:
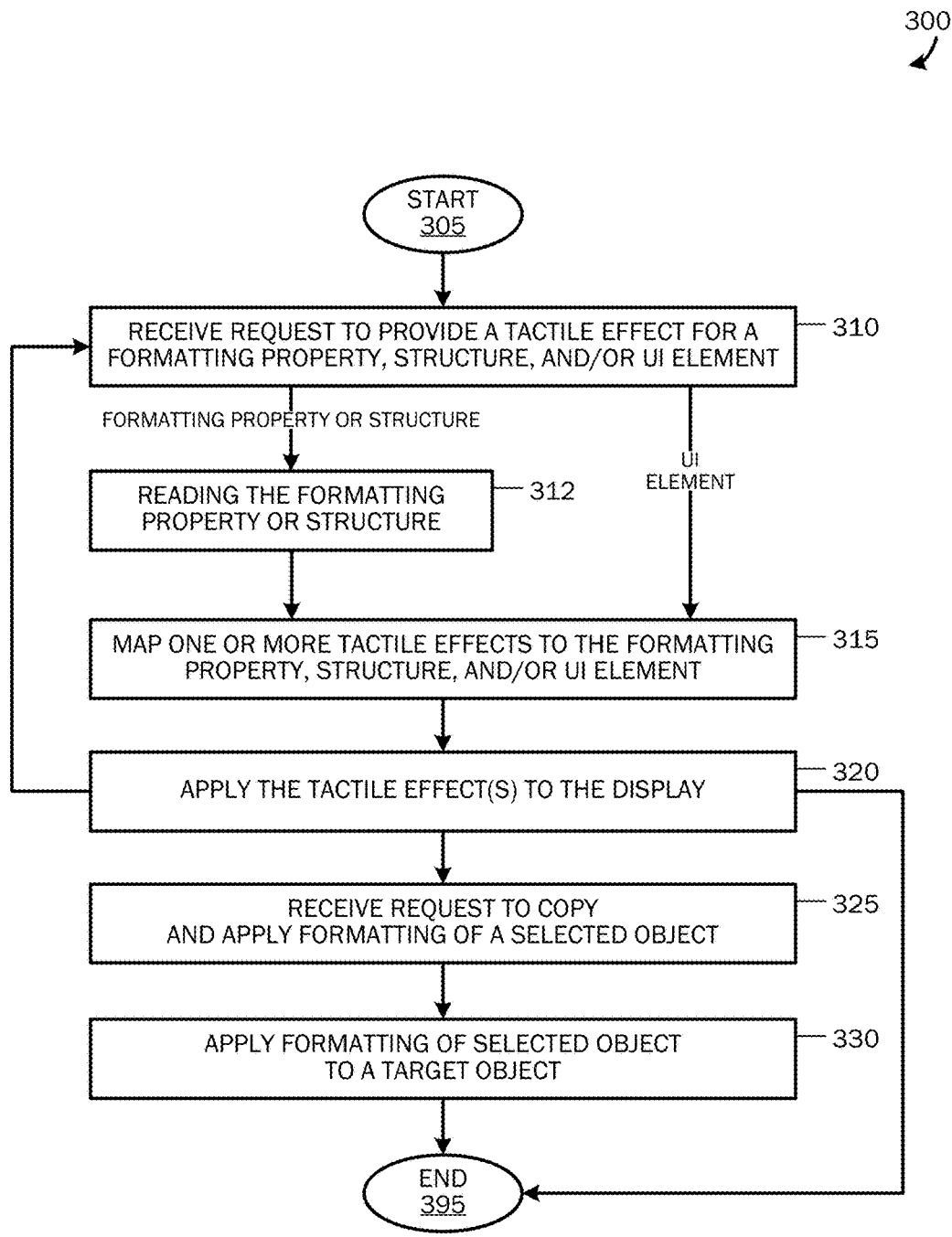
FIG. 3 is a flow chart of a method for providing mapping of tactile effects to application user interface elements, formatting properties, and document structure.

FIG. 3 is a flow chart showing one embodiment of a method 300 for providing mapping of tactile effects to application user interface elements, formatting properties, and document structure. The method 300 starts at OPERATION 305 and proceeds to OPERATION 310, where a request to provide a tactile effect 132 to a formatting property 202, structure 204, and/or UI element may be received. As described above, the request may be a preselected option, wherein a tactile effect 132 may be automatically mapped to and applied to certain formatting properties 202, structures 204, and/or UI elements; or the request may be a selection/command made by a user 102. For example, a user 102 may select a functionality command or input a voice command to apply tactile effects 132 to all or to specific formatting properties 202, structures 204, and/or UI elements.

If the request is to provide a tactile effect 132 for a formatting property 202 or a structure 204, the method 300 may proceed to OPERATION 312, where the formatting property 202 or structure 204 may be read. As described above, a formatting property 202 or structure 204 may be read from existing styles, file formats, and specifiers using standard industry conventions (e.g., HTML, CSS, JavaScript, application-specific tags, etc.)

The method 300 may proceed to OPERATION 315, where one or more tactile effects 132 may be mapped to all or to specific formatting properties 202, structures 204, and/or UI elements. If the request is to provide a tactile effect 132 for a formatting property 202 or a structure 204, the tactile effect 132 may be mapped according to the read formatting or structure.

At OPERATION 320, the one or more tactile effects 132 may be applied to the display 126. As described earlier, a tactile effect 132 may be applied at the location of or approximate to a formatting property 202, structure 204, and/or UI element, or may be applied in a tactile information area 206 where the user 102 may feel the effect with one hand as he/she touches a UI element or formatted object or structure in the displayed document with his/her other hand as was illustrated in FIG. 2E.

The method 300 may return to OPERATION 310, may proceed to OPERATION 325, or may end at OPERATION 395. If the method 300 returns to OPERATION 310, a next request may be received to provide a tactile effect 132 for a formatting property 202, structure 204, and/or UI element. As described above, state may be maintained as the user 102 explores structure 204 and/or formatting 202 of an object. A tactile effect 132 may also be selectively dismissed or may time out.

At OPERATION 325, a request may be received to apply formatting based on a current selection. The request may comprise selection of an object, input to copy the formatting properties 202 of the object, selection of a target object, and input to apply the copied formatting properties 202 to the target object.

The method 300 may proceed to OPERATION 330, where the copied formatting properties 202 may be applied to the target object. The method 300 may end at OPERATION 395.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
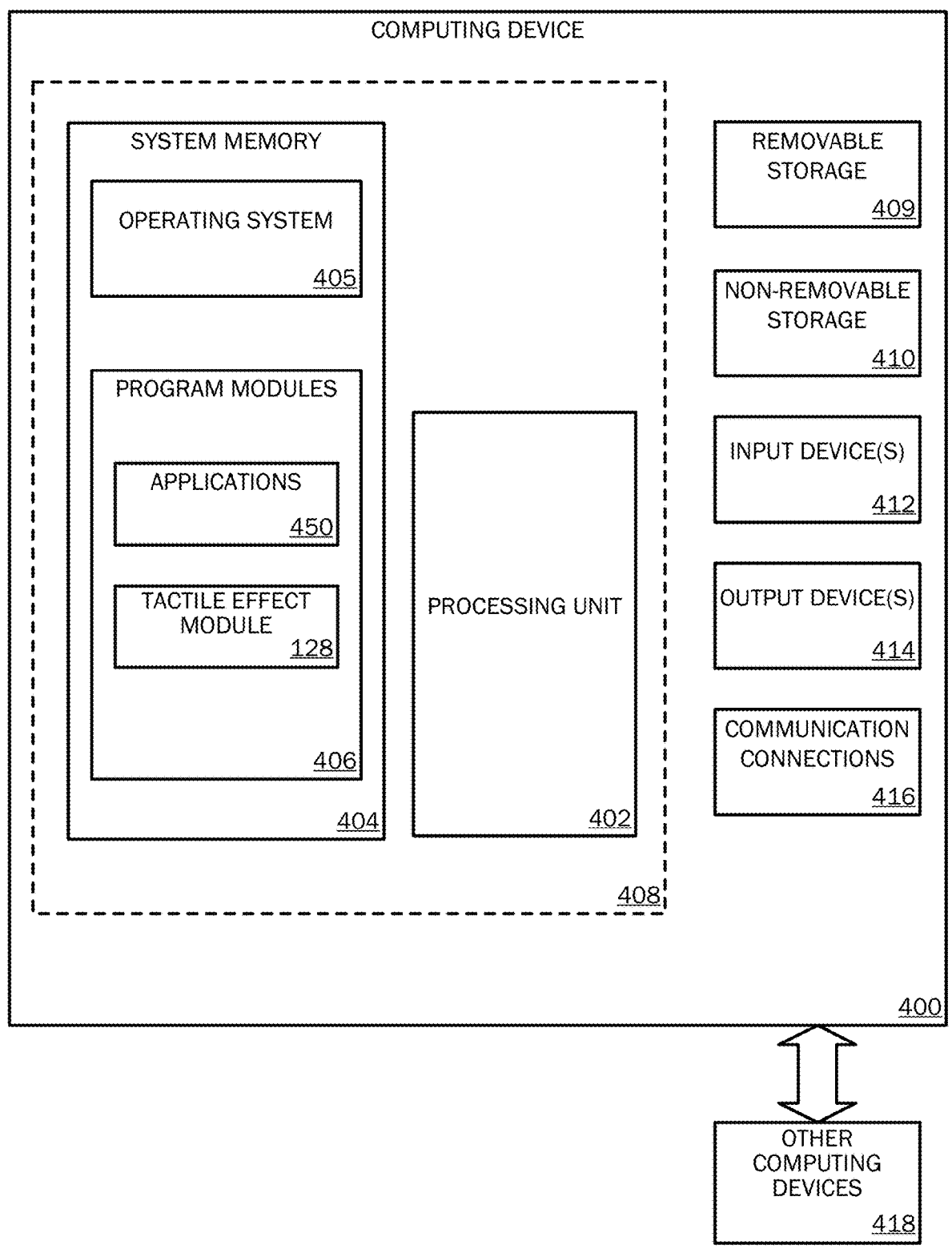
FIG. 4 is a block diagram illustrating example physical components of a computing device with which embodiments of the invention may be practiced.
Figure 5A:
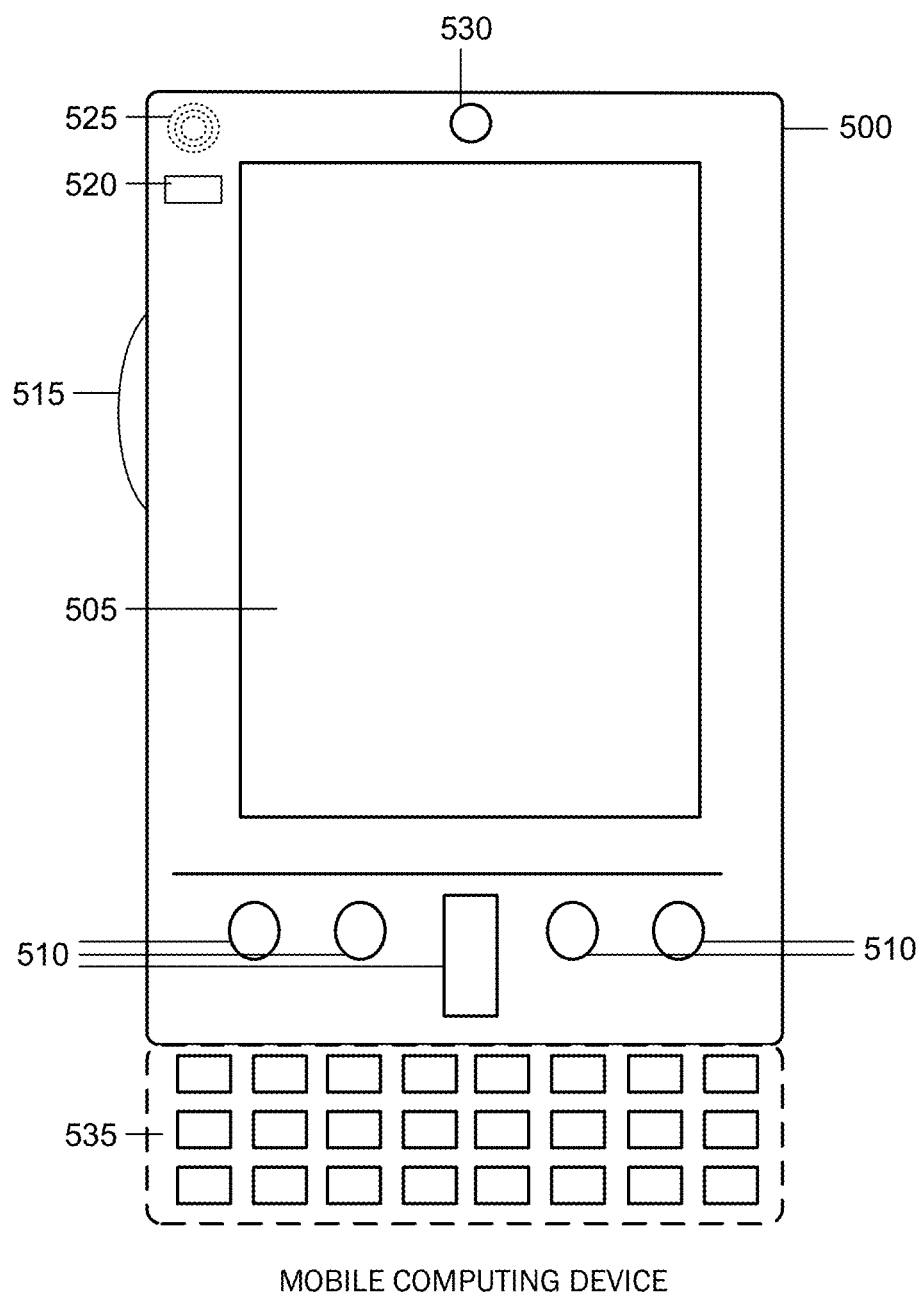
FIGS. 5A and 5B are simplified block diagrams of a mobile computing device with which embodiments of the present invention may be practiced.
Figure 5B:
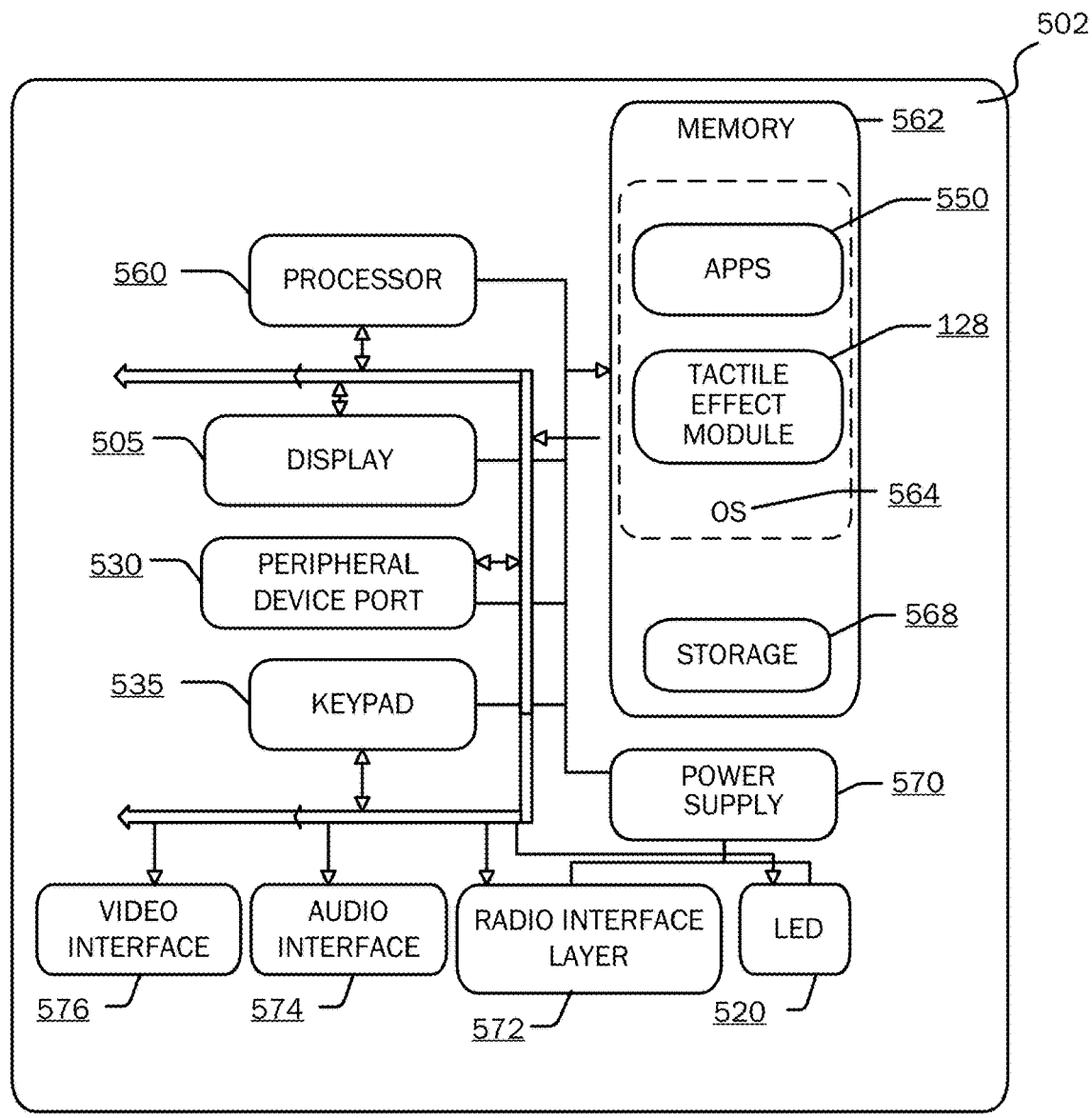
Figure 6:
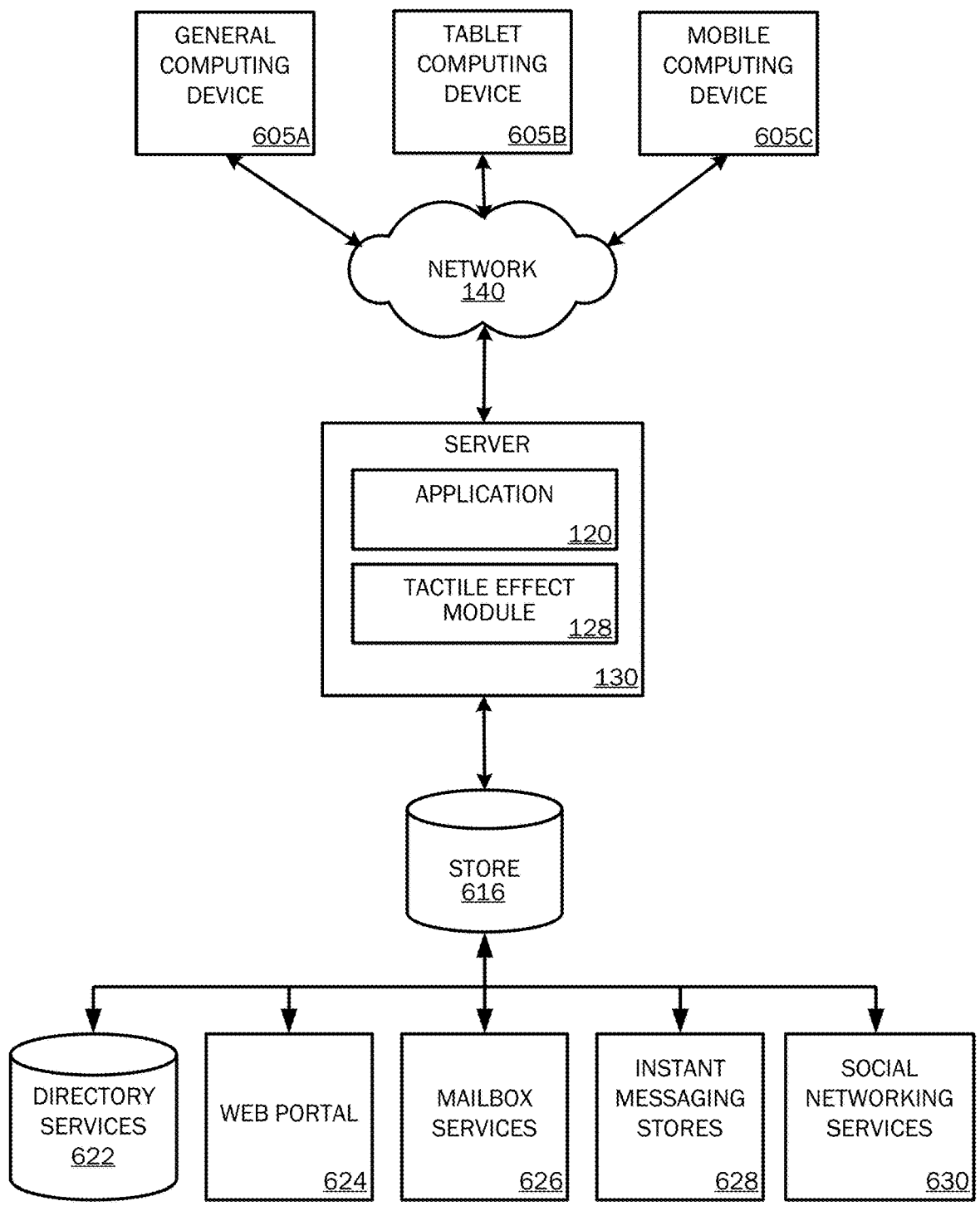
FIG. 6 is a simplified block diagram of a distributed computing system in which embodiments of the present invention may be practiced.

FIGS. 4-6 and the associated descriptions provide a discussion of a variety of operating environments in which embodiments of the invention may be practiced. However, the devices and systems illustrated and discussed with respect to FIGS. 4-6 are for purposes of example and illustration and are not limiting of a vast number of computing device configurations that may be utilized for practicing embodiments of the invention, described herein.

FIG. 4 is a block diagram illustrating physical components (i.e., hardware) of a computing device 400 with which embodiments of the invention may be practiced. The computing device components described below may be suitable for the computing device 110 described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 450 such as client application 120 and the tactile effect module 128. The operating system 405, for example, may be suitable for controlling the operation of the computing device 400. Furthermore, embodiments of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, one or more of the stages of the method 300 illustrated in FIG. 3. Other program modules that may be used in accordance with embodiments of the present invention and may include applications such as electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing mapping of tactile effects 132 to application user interface elements, formatting properties 202, and document structure 204 may be operated via application-specific logic integrated with other components of the computing device 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display 126, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which embodiments of the invention may be practiced. With reference to FIG. 5A, one embodiment of a mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 550, such as application 120 and the tactile effect module 128, may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

The visual indicator 520 may be used to provide visual notifications and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one embodiment of the architecture of a system for providing mapping of tactile effects 132 to application user interface elements, formatting properties 202, and document structure 204, as described above. Content developed, interacted with, or edited in association with the application 120 and/or tactile effect module 128 may be stored in different communication channels or other storage types. For example, various documents may be stored using a directory service 622, a web portal 624, a mailbox service 626, an instant messaging store 628, or a social networking site 630. The application 120 and/or tactile effect module 128 may use any of these types of systems or the like for mapping of tactile effects 132 to application user interface elements, formatting properties 202, and document structure 204, as described herein. A server 130 may provide the application 120 and/or tactile effect module 128 to clients 118. As one example, the server 130 may be a web server providing the application 120 and/or tactile effect module 128 over the web. The server 130 may provide the application 120 and/or tactile effect module 128 over the web to clients 110 through a network 140. By way of example, the client computing device 110 may be implemented and embodied in a personal computer 605A, a tablet computing device 605B and/or a mobile computing device 605C (e.g., a smart phone), or other computing device. Any of these embodiments of the client computing device may obtain content from the store 616.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

I claim:

1. A method for providing tactile effects to a display of a computing device, the method comprising:
   receiving, through a user interface, a first request to provide a first tactile effect for a first formatting property of an electronic document;
   as a result of receiving the first request, mapping the first tactile effect to the first formatting property, wherein the first formatting property is associated with at least a first element of a plurality of elements of the electronic document;
   receiving, through the user interface, a second request to provide a second tactile effect for a second formatting property of the electronic document, wherein the second tactile effect and the first tactile effect are distinct;
   as a result of receiving the second request, mapping the second tactile effect to the second formatting property, wherein the second formatting property is associated with at least a second element of the plurality of elements of the electronic document; and
   causing display of the electronic document on the display of the computing device, wherein displaying the electronic document comprises applying the first tactile effect to the display of the computing device for the first formatting property associated with the first element and applying the second tactile effect to the display of the computing device for the second formatting property associated with the second element, wherein the first tactile effect and the second tactile effect are distinct, and wherein applying the first tactile effect and the second tactile effect to the display comprises producing a change to at least a part of a surface of the display of the computing device.

2. The method of claim 1, wherein applying the first tactile effect to the display further comprises applying the first tactile effect at a location proximate to one or more elements comprising the first formatting property.

3. The method of claim 1, wherein applying the first tactile effect to the display further comprises applying the first tactile effect in a tactile information area.

4. The method of claim 3, wherein prior to applying the first tactile effect in the tactile information area, receiving a touch of one of one or more elements comprising the first formatting property.

5. The method of claim 1, further comprising:
   determining that a third element comprises a plurality of formatting properties;
   mapping a third tactile effect to each of the plurality of formatting properties; and
   applying the third tactile effect to the display at a location proximate to the third element.

6. The method of claim 1, wherein mapping the first tactile effect to the first formatting property comprises mapping an increased degree of the first tactile effect to a graduated level of first formatting.

7. The method of claim 1, wherein prior to mapping the first tactile effect to the first formatting property, reading the first formatting property using one or more of:
   file formats;
   tags; or
   specifiers.

8. The method of claim 1, wherein receiving the first request to provide the first tactile effect for the first formatting property comprises:
   receiving a selection of the first element in the electronic document; and
   providing the first tactile effect for other elements in the electronic document comprising the first formatting property.

9. The method of claim 1, further comprising:
   reading formatting properties of the plurality of elements in the electronic document.

10. The method of claim 1, further comprising:
    receiving a third request to provide a third tactile effect for a third formatting property;
    continuing to apply the first tactile effect;
    mapping the third tactile effect to the third formatting property; and
    applying the third tactile effect to the display, wherein applying the third tactile effect to the display comprises producing a second change to the display that is detectable by touching the surface.

11. The method of claim 10, wherein the third tactile effect is an increased degree of a same type of tactile effect as the first tactile effect.

12. The method of claim 10, wherein the third tactile effect is a different type of tactile effect than the first tactile effect.

13. A system for providing tactile effects to a display of a computing device, the system comprising:
    one or more processors; and
    a memory coupled to the one or more processors, the one or more processors operable to:
      receive, through a user interface, a first request to provide a first tactile effect for a first formatting property of an electronic document;
      as a result of receiving the first request, map the first tactile effect to the first formatting property, wherein the first formatting property is associated with at least a first element of a plurality of elements of the electronic document;

receive, through the user interface, a second request to provide a second tactile effect for a second formatting property of the electronic document, wherein the second tactile effect and the first tactile effect are distinct;

as a result of receiving the second request, map the second tactile effect to the second formatting property, wherein the second formatting property is associated with at least a second element of the plurality of elements of the electronic document; and cause display of the electronic document on the display of the computing device, wherein displaying the electronic document comprises applying the first tactile effect to the display of the computing device for the first formatting property associated with the first element and applying the second tactile effect to the display of the computing device for the second formatting property associated with the second element, wherein the first tactile effect and the second tactile effect are distinct, and wherein applying the first tactile effect and the second tactile effect to the display comprises producing a change to at least a part of a surface of the display of the computing device.

14. The system of claim 13, wherein the one or more processors are further operable to:

determine that the second element comprises a plurality of formatting properties;

map the second tactile effect to each of the plurality of formatting properties; and apply different tactile effects to the display proximate to the second element.

15. The system of claim 13, wherein in receiving the first request to provide the first tactile effect for the first formatting property, the one or more processors are further operable to:

receive a selection of the first element in the electronic document; and provide the first tactile effect for one or more other elements in the electronic document comprising the first formatting property.

16. The system of claim 13, wherein the one or more processors are further operable to:

receive a third request to provide a next tactile effect for one or more of formatting properties;

continue to apply the first tactile effect;

map the next tactile effect to the one or more formatting properties; and apply the next tactile effect to the display, wherein applying the next tactile effect to the display comprises producing a second change to the display that is detectable by touch and the next tactile effect is an increased degree of a same type of tactile effect as the first tactile effect.

17. A computer readable storage device storing computer executable instructions which, when executed by a computer, perform operations of:

receiving, through a user interface, a first request to provide a first tactile effect for a first formatting property of an electronic document;

as a result of receiving the first request, mapping the first tactile effect to the first formatting property, wherein the first formatting property is associated with at least a first element of a plurality of elements of the electronic document;

receiving, through the user interface, a second request to provide a second tactile effect for a second formatting property of the electronic document, wherein the second tactile effect and the first tactile effect are distinct;

as a result of receiving the second request, mapping the second tactile effect to the second formatting property, wherein the second formatting property is associated with at least a second element of the plurality of elements of the electronic document; and causing display of the electronic document on a display of a computing device, wherein displaying the electronic document comprises applying the first tactile effect to the display of the computing device for the first formatting property associated with the first element and applying the second tactile effect to the display of the computing device for the second formatting property associated with the second element, wherein the first tactile effect and the second tactile effect are distinct, and wherein applying the first tactile effect and the second tactile effect to the display comprises producing a change to at least a part of a surface of the display of the computing device.

18. The computer readable storage device of claim 17, further storing the computer executable instructions which, when executed by the computer, further perform the operations of:

receiving a third request to provide a next tactile effect to the second formatting property;

mapping a third tactile effect to the second formatting property; and applying the third tactile effect to the display, wherein applying the third tactile effect to the display comprises producing a second change to the display that is detectable by touching the surface.

* * * * *